United States Patent
Lisewski et al.

(10) Patent No.: US 10,635,099 B2
(45) Date of Patent: Apr. 28, 2020

(54) MULTICAST TRANSMISSION OF SERVICE AREA INFORMATION ASSOCIATED WITH A VEHICLE NETWORK

(71) Applicant: Verizon Patent and Licensing Inc., Arlington, VA (US)

(72) Inventors: Kevin Lisewski, Ramsey, NJ (US); Arvind Basra, Glen Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/682,045

(22) Filed: Aug. 21, 2017

(65) Prior Publication Data

US 2019/0056728 A1 Feb. 21, 2019

(51) Int. Cl.

| | |
|---|---|
| *G05D 1/00* | (2006.01) |
| *G07C 5/00* | (2006.01) |
| *G08G 1/00* | (2006.01) |
| *B60W 30/00* | (2006.01) |
| *H04W 4/40* | (2018.01) |
| *H04W 4/00* | (2018.01) |
| *G06Q 10/04* | (2012.01) |
| *H04W 4/06* | (2009.01) |

(52) U.S. Cl.
CPC ........... *G05D 1/0038* (2013.01); *B60W 30/00* (2013.01); *G07C 5/008* (2013.01); *G08G 1/20* (2013.01); *G08G 1/207* (2013.01); *H04W 4/00* (2013.01); *H04W 4/40* (2018.02); *G06Q 10/047* (2013.01); *H04W 4/06* (2013.01)

(58) Field of Classification Search
CPC ........ G05D 1/0038; G07C 5/008; G08G 1/20; G08G 1/207; H04W 4/40; H04W 4/00; H04W 4/06; B60W 30/00; G06Q 10/047
See application file for complete search history.

(56) References Cited

U.S. PATENT DOCUMENTS

| | | | | |
|---|---|---|---|---|
| 6,480,783 | B1* | 11/2002 | Myr ................... | G01C 21/3492 340/990 |
| 2009/0287401 | A1* | 11/2009 | Levine ............... | G01C 21/3492 701/117 |
| 2010/0060480 | A1* | 3/2010 | Bai ........................ | H04L 45/46 340/901 |
| 2014/0159923 | A1* | 6/2014 | Koodli ................. | G08G 1/0112 340/905 |
| 2016/0093213 | A1* | 3/2016 | Rider ................... | G08G 1/0965 701/537 |
| 2016/0358479 | A1* | 12/2016 | Riedelsheimer ........ | H04L 67/12 |
| 2018/0196443 | A1* | 7/2018 | Bai ....................... | H04W 4/046 |
| 2018/0356837 | A1* | 12/2018 | Lisewski ............... | H04L 9/3213 |

* cited by examiner

*Primary Examiner* — Mohamed Barakat

(57) ABSTRACT

A device can receive telemetry information from a set of telemetry devices associated with a set of vehicles. The telemetry information being received via a set of unicast transmissions that correspond to the set of telemetry devices. The device can determine, based on the telemetry information, that the set of vehicles are associated with the service area. The device can generate service area information using the telemetry information. The device can provide, to the set of telemetry devices, the service area information to permit a control device of a vehicle, of the set of vehicles, to perform an action. The service area information can be provided via a multicast transmission.

20 Claims, 11 Drawing Sheets

MULTICAST TRANSMISSION OF SERVICE AREA INFORMATION ASSOCIATED WITH A VEHICLE NETWORK

BACKGROUND

Wireless networks allocate base station resources for different services, such as voice services, unicast services, multicast services, etc. Evolved multimedia broadcast multicast service ("eMBMS") provides efficient data delivery by allowing information to be sent once and received by multiple devices using a multicast stream.

DETAILED DESCRIPTION OF PREFERRED EMBODIMENTS

The following detailed description of example implementations refers to the accompanying drawings. The same reference numbers in different drawings can identify the same or similar elements.

Autonomous vehicles can rely on both internal data sources and external data sources during operation. With respect to internal data sources, autonomous vehicles can include a large number of embedded computers, hardware controllers, global positioning system (GPS) receivers, and connectivity components that each can generate and receive significant amounts of data.

In order to operate effectively, efficiently, and safely, autonomous vehicles might also receive, process, and/or interpret information associated with external data sources. For example, such information can include position data of surrounding vehicles, status data of nearby infrastructure, traffic data, data related to safety hazards, or the like. In order to utilize such information, autonomous vehicles might need to access a potentially large volume of information, and/or might need to access and/or process the information substantially instantaneously.

Some implementations described herein provide a telemetry system that can receive, via respective unicast transmissions, telemetry information from a set of telemetry devices associated with a set of vehicles. Additionally, some implementations described herein permit the telemetry system to determine, using the telemetry information, that the set of vehicles are associated with a service area. Additionally, some implementations described herein permit the telemetry system to generate service area information associated with the service area, and provide, via a multicast transmission, the service area information to the set of telemetry devices using a multicast service.

In this way, some implementations described herein permit synchronized information delivery for latency sensitive applications, decrease margin of error in data delivery, allow for efficient network usage by efficient distribution and efficient use of network bandwidth, and require reduced communication and/or signaling relative to direct vehicle to vehicle communications. In this way, some implementations described herein conserve processor and/or memory resources of devices associated with vehicles and/or conserve network resources.

Figure 1A:
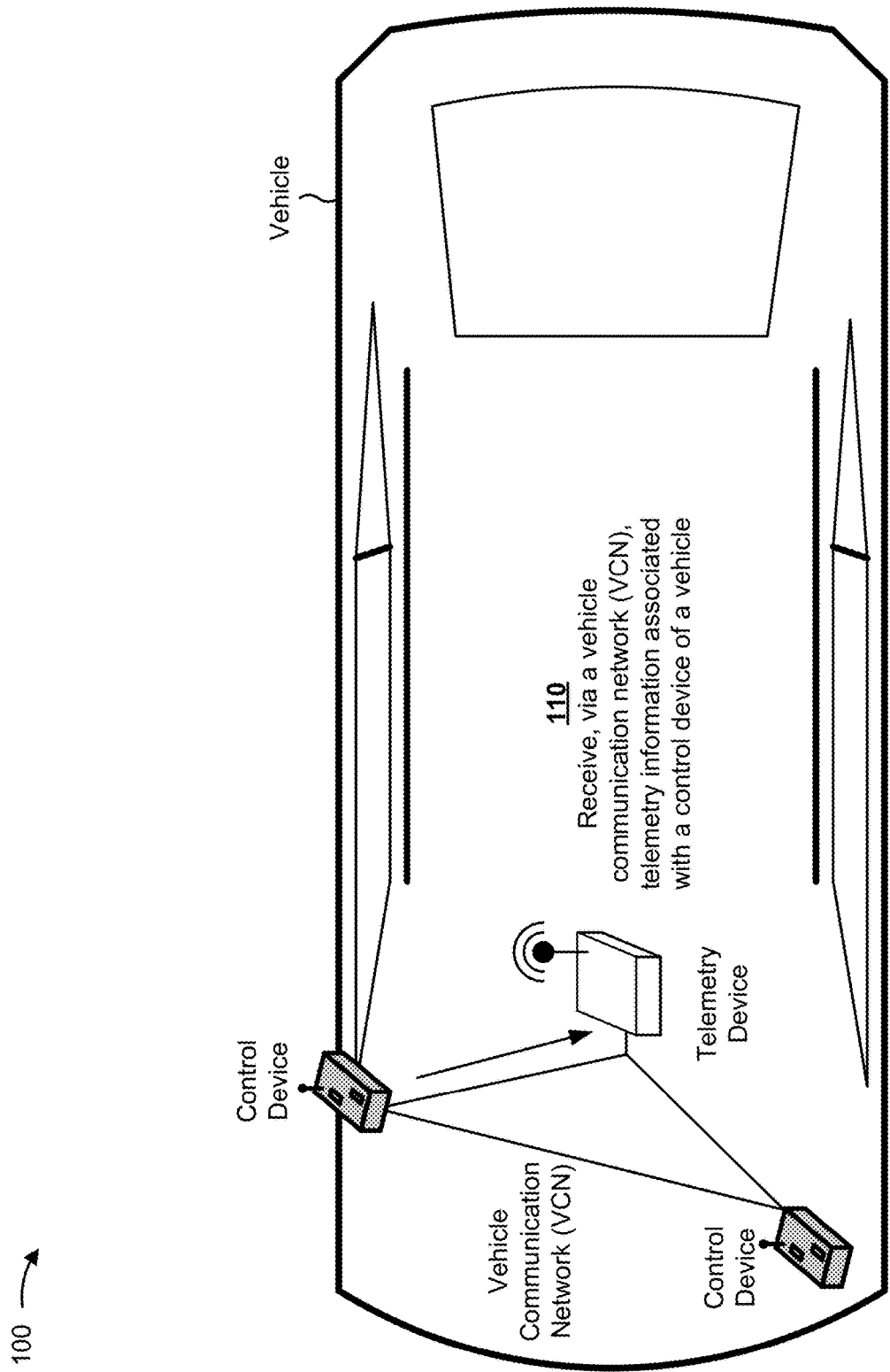
FIGS. 1A-1D are diagrams of an overview of an example implementation described herein.

FIGS. 1A-1D are diagrams of an overview of an example implementation 100 described herein. As shown in FIG. 1A, example implementation 100 can include a vehicle that includes a telemetry device and a set of one or more control devices. For example, the control devices can include one or more electronic control units, sensors, embedded devices, etc., as described in more detail elsewhere herein.

In some implementations, telemetry information can refer to information that is measured, generated, sensed, etc. by a set of control devices of a vehicle. As an example, a GPS system can generate telemetry information that corresponds to geographic coordinates of the vehicle. As another example, an engine speed sensor can generate telemetry information that corresponds to an engine speed of the vehicle. It should be understood that a vehicle can include a large number of control devices that each respectively generates, measures, senses, etc. various types of telemetry information.

As further shown in FIG. 1A, and by reference number 110, the telemetry device can receive, via a vehicle communication network (VCN), telemetry information associated with a control device of the vehicle. For example, the control devices can provide the telemetry information to the telemetry device during operation of the vehicle. In some implementations, the telemetry device can receive telemetry information from hundreds of control devices of the vehicle.

Figure 1B:
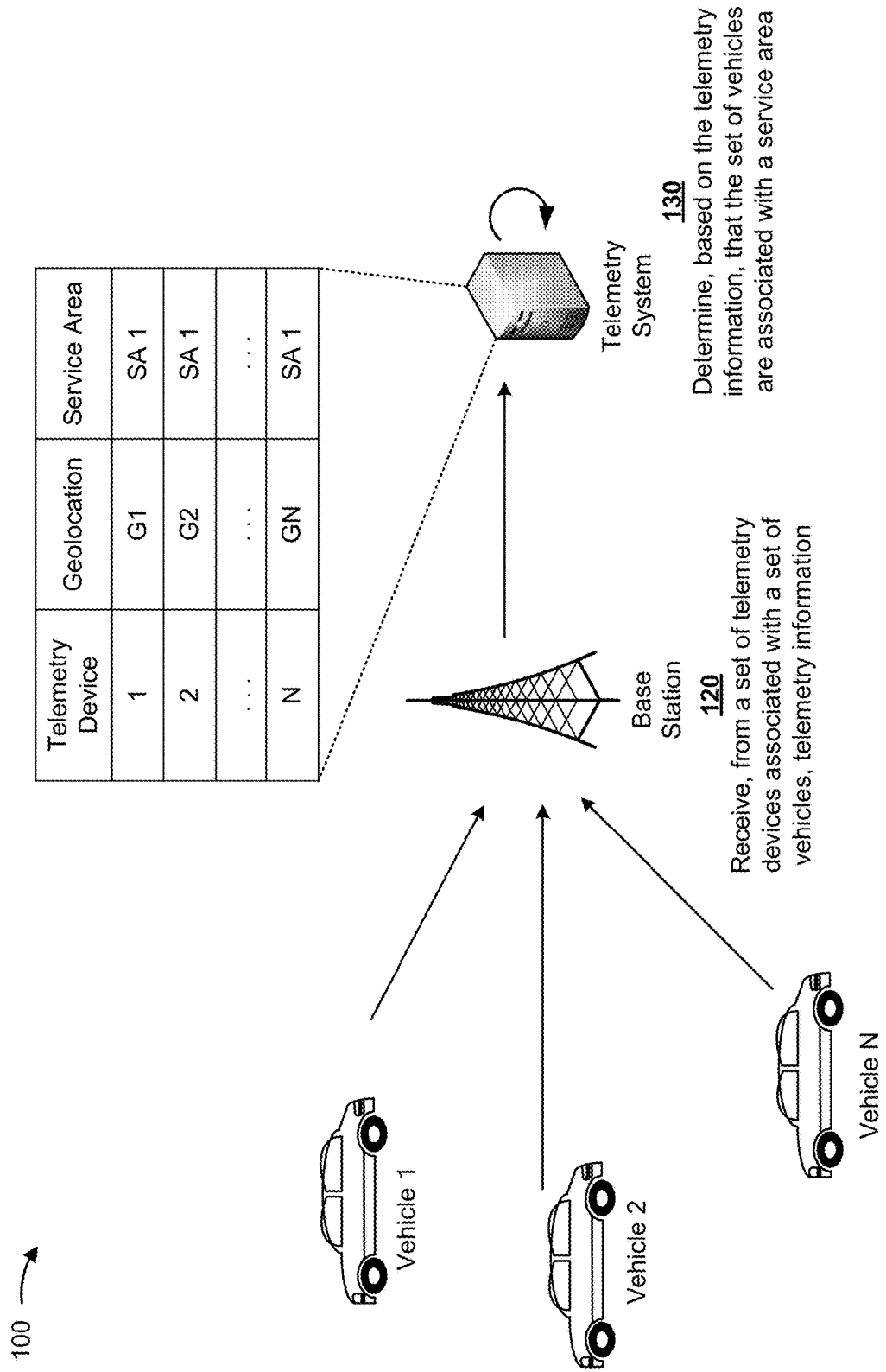

As shown in FIG. 1B, example implementation 100 can include a set of vehicles, a base station, and a telemetry system. As further shown in FIG. 1B, and by reference number 120, the telemetry system can receive, from a set of telemetry devices associated with a set of vehicles and via a base station, telemetry information. For example, the telemetry devices can provide, via respective unicast transmissions, the telemetry information to the telemetry system via the base station. In some implementations, multiple (e.g., hundreds, thousands, millions, etc.) vehicles can send unicast transmissions of telemetry information to the telemetry system.

As further shown in FIG. 1B, and by reference number 130, the telemetry system can determine, based on the telemetry information, that the set of vehicles are associated with a service area. In some implementations, a service area can refer to a particular geographic area, an area associated with a geofence, an area in which a telemetry device can receive multicast transmissions of service area information, a set of cells covered by particular a set of base stations, or the like.

In some implementations, the telemetry system can identify geolocations of the vehicles using the telemetry information, and can determine that the telemetry information is associated with the service area based on the geolocations. For example, as shown, the telemetry system can store, in a data structure, information that associates each particular telemetry device with a particular geolocation and a particular service area. As shown, assume that geolocations G1, G2, and GN are each associated with a same service area SA 1. In this way, the telemetry system can identify telemetry information that is associated with a particular service area, and can generate service area information using the respective telemetry information, as described below.

Figure 1C:
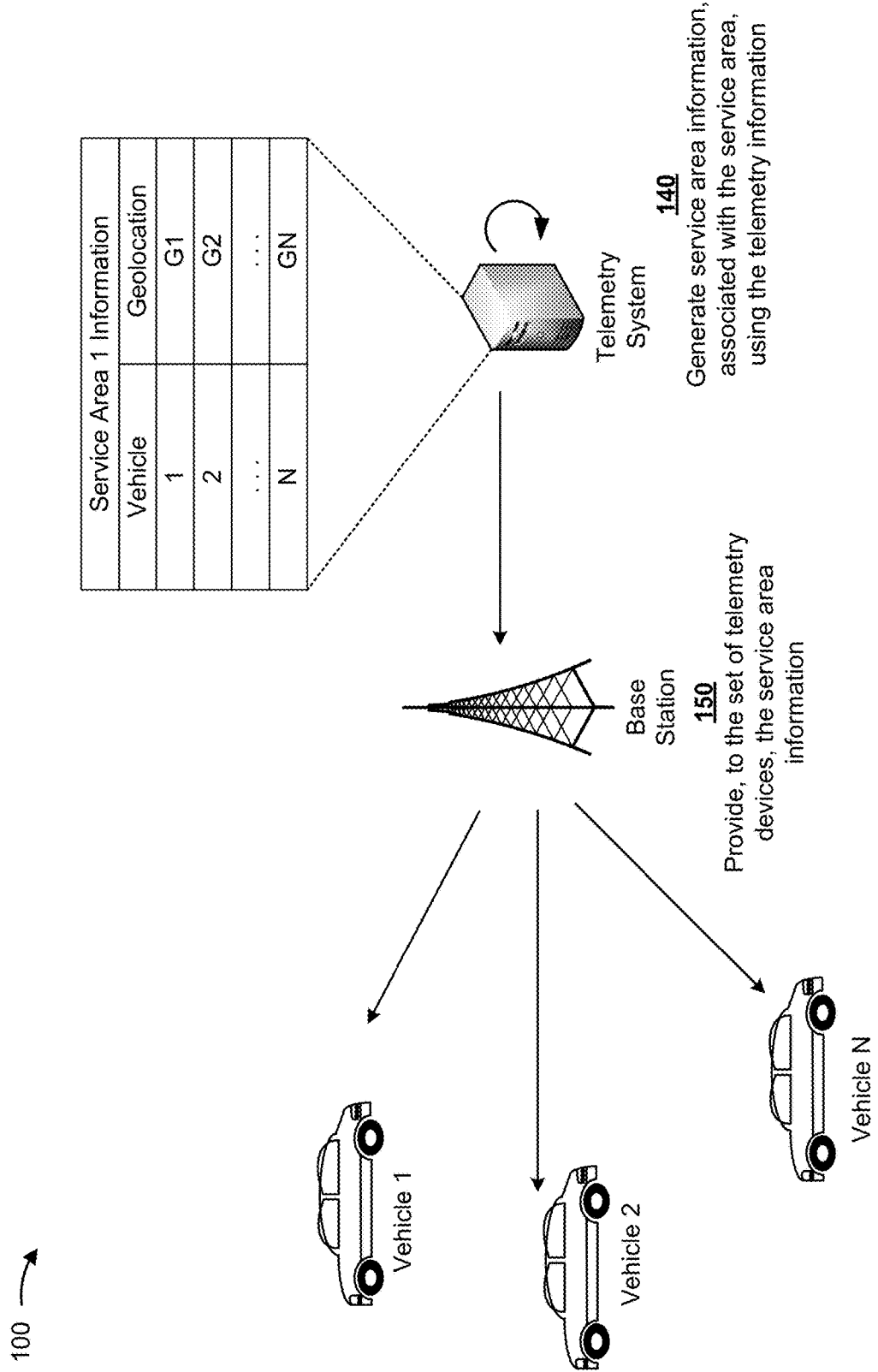

As shown in FIG. 1C, and by reference number 140, the telemetry system can generate service area information, associated with the service area, using the telemetry information. In some implementations, the service area information can include information associated with the service area, telemetry information associated with a set of telemetry devices, information that permits and/or causes a control device of a vehicle to perform an action, or the like.

As an example, and as shown, the service area information can include information that identifies respective geolocations of all of the vehicles that are located within the service area. As further shown in FIG. 1C, and by reference number 150, the telemetry system can provide, to the set of telemetry devices, the service area information. For example, the telemetry system can provide the service area information to a set of vehicles via a multicast service. While particular service area information is shown in FIG. 1C, it should be understood that service information can include any type of information that is associated with a service area.

Figure 1D:
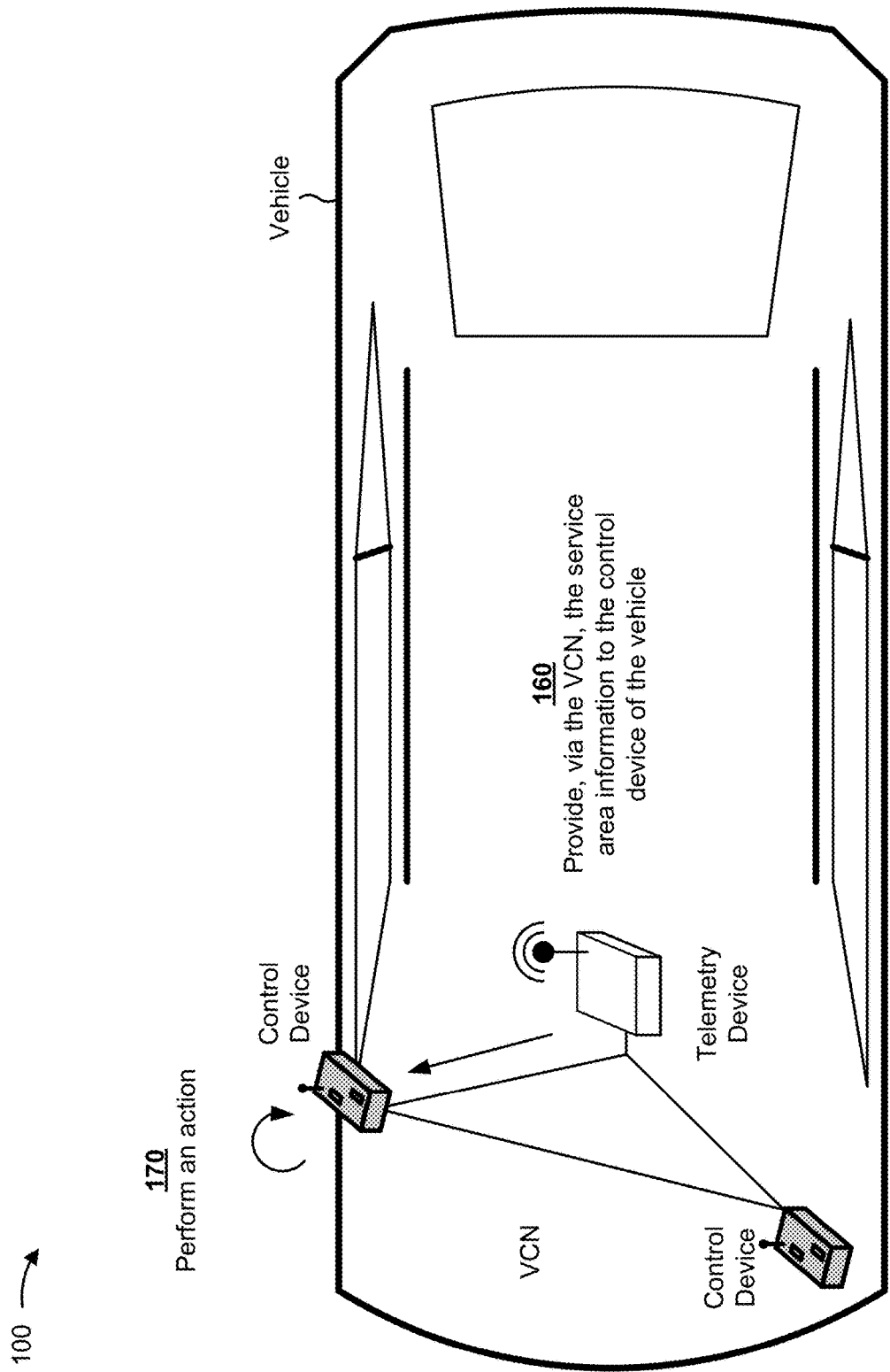

As shown in FIG. 1D, and by reference number 160, the telemetry device of a particular vehicle can provide, via the VCN, the service area information to a control device of the vehicle. As shown by reference number 170, the control device can utilize the service area information to perform an action. For example, a control device that is responsible for steering can adjust the steering based on respective geolocations of other vehicles in the service area (e.g., to avoid a collision, to maintain a particular spacing, to reduce congestion associated with a route, or the like).

As an example, assume that the vehicle is in proximity to a set of ten other vehicles. In this case, and in the situation where vehicle to vehicle signaling is employed, the vehicle might be required to receive ten separate transmissions that include geolocation information of respective vehicles. As such, the potential for skewed synchronization of information delivery is increased, computational expense is increased, the potential for error in information delivery is increased, etc.

Some implementations described herein permit synchronized information delivery in association with latency sensitive applications (e.g., autonomous driving systems, advanced driver assistance systems, or the like), decrease margin of error in data delivery, allow for efficient network usage by efficient distribution and efficient use of network bandwidth, and require less communication and/or signaling relative to direct vehicle to vehicle communications.

For example, by using a multicast service, some implementations described herein permit service area information to provided and/or received by a large number of telemetry devices associated with vehicles substantially concurrently. Thereby, some implementations described herein increase safety, efficiency, reliability, etc. of latency sensitive applications.

As indicated above, FIGS. 1A-1D are provided merely as an example. Other examples are possible and can differ from what was described with regard to FIGS. 1A-1D.

Figure 2:
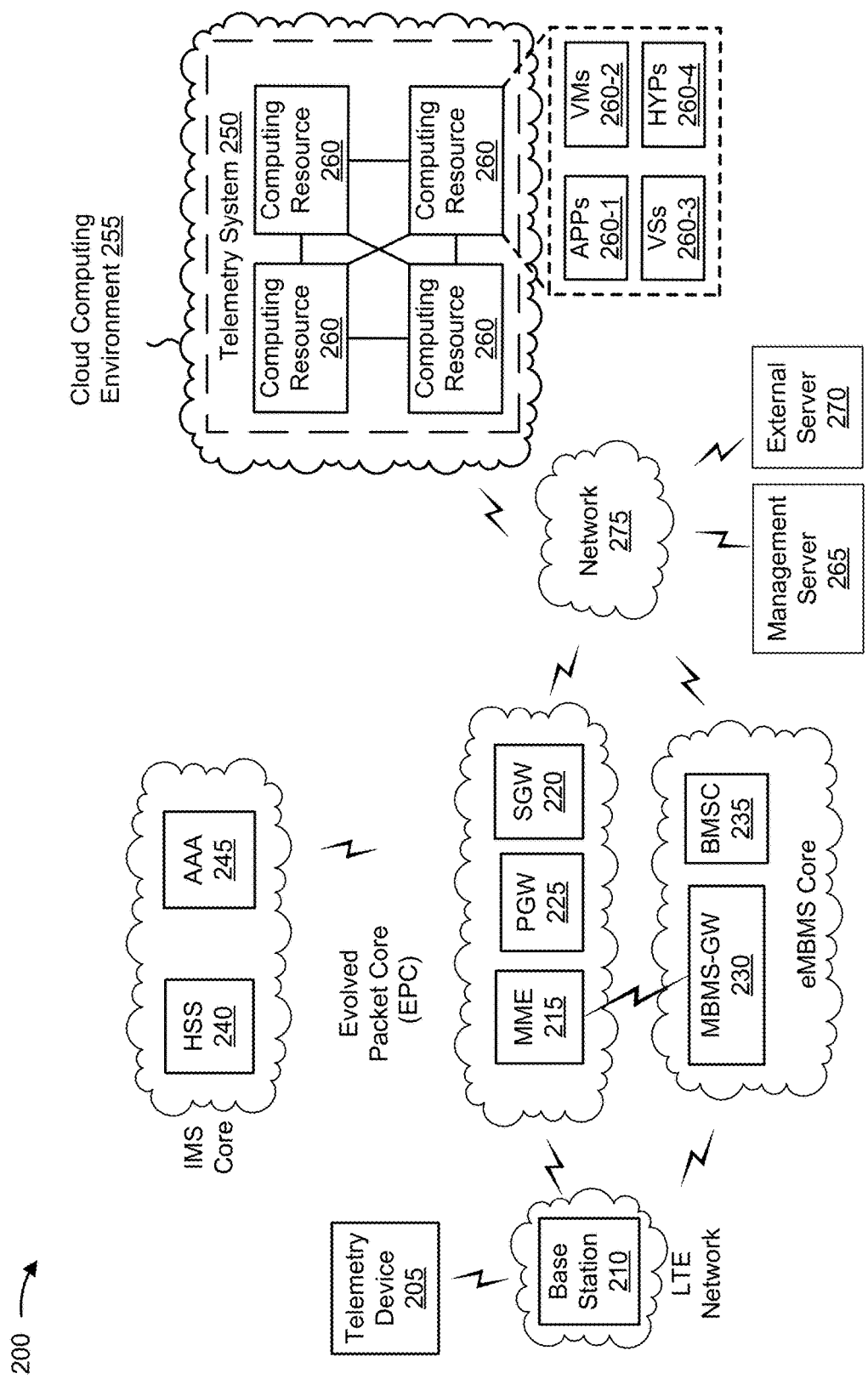
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a telemetry device 205, a base station 210, a mobility management entity device (MME) 215, a serving gateway (SGW) 220, a packet data network gateway (PGW) 225, a Multimedia Broadcast/Multicast Service Gateway (MBMS-GW) 230, a Broadcast-Multicast Service Center device (BMSC) 235, a home subscriber server (HSS) 240, an authentication, authorization, and accounting server (AAA) 245, a telemetry system 250, a management server 265, an external server 270, and a network 275. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a fifth generation (5G) network or a third generation (3G) network.

Environment 200 includes an evolved packet system (EPS) that includes an LTE network, an evolved packet core (EPC), and/or an eMBMS core that operate based on a third generation partnership project (3GPP) wireless communication standard.

The LTE network includes a radio access network (RAN) that includes one or more base stations 210 that take the form of evolved Node Bs (eNBs) via which telemetry device 205 communicates with the EPC.

The EPC can include MME 215, SGW 220, and/or PGW 225 that enable telemetry device 205 to communicate with network 275 and/or an Internet protocol (IP) multimedia subsystem (IMS) core.

The IMS core can include HSS 240 and/or AAA 245, and can manage device registration and authentication, session initiation, etc., associated with telemetry device 205. HSS 240 and/or AAA 245 can reside in the EPC and/or the IMS core.

The eMBMS core can include MBMS-GW 230 and/or BMSC 235 that enable telemetry system 250 to communicate with telemetry devices 205 using MBMS in association with the LTE network.

In some implementations, eMBMS core can permit multicast services, such as unidirectional downlink transmissions from a cell to a set of telemetry devices 205 (e.g., associated with a service area). Each telemetry device 205 can receive the downlink data (e.g., service area information) using the same set of air-interface resources. In this way, some implementations described herein improve the efficiency of downlink data transmission by avoiding the need for dedicated resource allocations.

In some implementations, the eMBMS core can permit multicast services, such as unidirectional downlink transmissions from a cell to a set of telemetry devices 205 (e.g., associated with a service area). In some implementations, telemetry device 205 might be required to perform specific procedures prior to receiving downlink data associated with a multicast service implemented by eMBMS core. For example, telemetry device 205 can perform subscription and/or joining procedures prior to receiving downlink data associated with a multicast service. In this way, eMBMS core can provide a dedicated and secure network path for multicast transmissions to a particular service area.

In some implementations, MBMS-GW 230 can communicate with MME 215 to receive information that permits MBMS-GW 230 to authenticate, authorize, and/or subscribe telemetry devices 205 to receive downlink data associated with a service area. Additionally, or alternatively, MBMS-GW 230 can communicate with MME 215 to receive mobility management data associated with telemetry devices 205, such as data that identifies that telemetry devices 205 are leaving a service area, have entered another service area, and/or the like.

In some implementations, eMBMS core can provide MBMS over a single frequency network (MBSFN), which corresponds to the simulcast transmission of MBMS data. For example, an MBSFN can provide identical data streams from multiple time synchronized base stations 210 using the same RF carrier.

As used herein, a service area can refer to an area in which downlink data belonging to a specific MBMS is transmitted. Additionally, a service area can refer to an MBSFN synchronization area defined by a set of base stations 210 that can be synchronized to perform MBSFN transmissions.

In this way, the eMBMS core provides a parallel network path (e.g., parallel to an uplink data path via the EPC core) for the downlink multicast delivery of service area information, and provides dedicated and secure transmission of downlink data to a service area and/or a set of service areas. By utilizing information from MME 215, MBMS-GW 230 improves security of service area information by permitting authorized and/or authenticated telemetry devices 205 to receive service area information.

Telemetry device 205 includes one or more devices capable of communicating with base station 210 and/or a network (e.g., network 275). For example, telemetry device 205 can include a wireless communication device, a telematics device, a radiotelephone, a personal communications system (PCS) terminal (e.g., that can combine a cellular radiotelephone with data processing and data communications capabilities), a smart phone, a laptop computer, a tablet computer, and/or a similar device. In some implementations, telemetry device 205 includes one or more machine-to-machine (M2M) devices and/or one or more Internet of Things (IoT) devices (e.g., any "thing" in the IoT). Telemetry device 205 can send traffic to and/or receive traffic from network 275 (e.g., via base station 210, SGW 220, and/or PGW 225).

In some implementations, telemetry device 205 can be associated with a vehicle. For example, a vehicle can include an automobile, a boat, a plane, heavy equipment, a motorcycle, a train, an unmanned aerial vehicle (UAV), a bicycle, a motorcycle, or the like.

Base station 210 includes one or more devices capable of transferring traffic destined for and/or received from telemetry device 205. In some implementations, base station 210 can include an eNB associated with the LTE network that receives traffic from and/or sends traffic to network 275 via SGW 220 and/or PGW 225. Additionally, or alternatively, one or more base stations 210 can be associated with a RAN that is not associated with the LTE network. Base station 210 can send traffic to and/or receive traffic from telemetry device 205 via an air interface. In some implementations, base station 210 can include a small cell base station, such as a base station of a microcell, a picocell, and/or a femtocell.

MME 215 includes one or more devices, such as one or more server devices, capable of managing authentication, activation, deactivation, and/or mobility functions associated with telemetry device 205. In some implementations, MME 215 can perform operations relating to authentication of telemetry device 205. Additionally, or alternatively, MME 215 can facilitate the selection of a particular SGW 220 and/or a particular PGW 225 to serve traffic to and/or from telemetry device 205. MME 215 can perform operations associated with handing off telemetry device 205 from a first base station 210 to a second base station 210 when telemetry device 205 is transitioning from a first cell associated with the first base station 210 to a second cell associated with the second base station 210. Additionally, or alternatively, MME 215 can select another MME (not pictured), to which telemetry device 205 should be handed off (e.g., when telemetry device 205 moves out of range of MME 215).

SGW 220 includes one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 275 (e.g., via PGW 225) and/or other network devices associated with the EPC and/or the IMS core. SGW 220 can also receive traffic from network 275 and/or other network devices, and can send the received traffic to telemetry device 205 via base station 210. Additionally, or alternatively, SGW 220 can perform operations associated with handing off telemetry device 205 to and/or from an LTE network.

PGW 225 includes one or more devices capable of providing connectivity for telemetry device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 275. Additionally, or alternatively, PGW 225 can receive traffic from network 275, and can send the traffic to telemetry device 205 via SGW 220 and base station 210. PGW 225 can record data usage information (e.g., byte usage), and can provide the data usage information to AAA 245.

MBMS-GW 230 includes one or more devices capable of routing packets related to eMBMS. For example, MBMS-GW 230 can include a traffic transfer device, such as a gateway, a router, a modem, a switch, a firewall, a NIC, a hub, a bridge, a server device, an OADM, or any other type of device that processes and/or transfers traffic. MBMS-GW 230 can receive traffic from network 275 and/or other network devices, and can send the received traffic to telemetry device 205 via base station 210.

BMSC 235 includes one or more devices capable of receiving, generating, storing, processing, and/or providing information associated with providing a service. For example, BMSC 235 can include a server device, a traffic transfer device (e.g., a router, a switch, a hub, etc.), or a similar device. In some implementations, BMSC 235 can allocate bandwidth for providing a multicast service, and/or can instruct other devices associated with providing the multicast service.

HSS 240 includes one or more devices, such as one or more server devices, capable of managing (e.g., receiving, generating, storing, processing, and/or providing) information associated with telemetry device 205. For example, HSS 240 can manage subscription information associated with telemetry device 205, such as information that identifies a subscriber profile of a user (or an entity) associated with telemetry device 205, information that identifies services and/or applications that are accessible to telemetry device 205, location information associated with telemetry device 205, a network identifier (e.g., a network address) that identifies telemetry device 205, information that identifies a treatment of telemetry device 205 (e.g., quality of service information, a quantity of minutes allowed per time period, a quantity of data consumption allowed per time period, etc.), and/or similar information. HSS 240 can provide this information to one or more other devices of environment 200 to support the operations performed by those devices.

AAA 245 includes one or more devices, such as one or more server devices, that perform authentication, authorization, and/or accounting operations for communication sessions associated with telemetry device 205. For example, AAA 245 can perform authentication operations for telemetry device 205 and/or a user of telemetry device 205 (e.g., using one or more credentials), can control access, by telemetry device 205, to a service and/or an application (e.g., based on one or more restrictions, such as time-of-day restrictions, location restrictions, single or multiple access restrictions, read/write restrictions, etc.), can track resources consumed by telemetry device 205 (e.g., a quantity of data consumed, etc.), and/or can perform similar operations.

Telemetry system 250 includes one or more devices capable of receiving, via unicast transmission, telemetry information from a set of telemetry devices 205, processing the telemetry information, and providing, via multicast transmission, service area information to the set of telemetry devices 205. In some implementations, telemetry system 250 can be designed to be modular such that certain software components can be swapped in or out depending on a particular need. As such, telemetry system 250 can be easily and/or quickly reconfigured for different uses.

In some implementations, as shown, telemetry system 250 can be hosted in cloud computing environment 255. Notably, while implementations described herein describe telemetry system 250 as being hosted in cloud computing environment 255, in some implementations, telemetry system 250 might not be cloud-based (i.e., can be implemented outside of a cloud computing environment) or can be partially cloud-based.

Cloud computing environment 255 includes an environment that hosts telemetry system 250. Cloud computing environment 255 can provide computation, software, data access, storage, etc. services that do not require end-user (e.g., telemetry device 205) knowledge of a physical location and configuration of system(s) and/or device(s) that hosts telemetry system 250. As shown, cloud computing environment 255 can include a group of computing resources 260 (referred to collectively as "computing resources 260" and individually as "computing resource 260").

Computing resource 260 includes one or more personal computers, workstation computers, server devices, or other types of computation and/or communication devices. In some implementations, computing resource 260 can host telemetry system 250. The cloud resources can include compute instances executing in computing resource 260, storage devices provided in computing resource 260, data transfer devices provided by computing resource 260, etc. In some implementations, computing resource 260 can communicate with other computing resources 260 via wired connections, wireless connections, or a combination of wired and wireless connections.

As further shown in FIG. 2, computing resource 260 includes a group of cloud resources, such as one or more applications ("APPs") 260-1, one or more virtual machines ("VMs") 260-2, virtualized storage ("VSs") 260-3, one or more hypervisors ("HYPs") 260-4, or the like.

Application 260-1 includes one or more software applications that can be provided to or accessed by a client device. Application 260-1 can eliminate a need to install and execute the software applications on telemetry device 205. For example, application 260-1 can include software associated with telemetry system 250 and/or any other software capable of being provided via cloud computing environment 255. In some implementations, one application 260-1 can send/receive information to/from one or more other applications 260-1, via virtual machine 260-2.

Virtual machine 260-2 includes a software implementation of a machine (e.g., a computer) that executes programs like a physical machine. Virtual machine 260-2 can be either a system virtual machine or a process virtual machine, depending upon use and degree of correspondence to any real machine by virtual machine 260-2. A system virtual machine can provide a complete system that supports execution of a complete operating system ("OS"). A process virtual machine can execute a single program, and can support a single process. In some implementations, virtual machine 260-2 can execute on behalf of a user (e.g., telemetry device 205), and can manage infrastructure of cloud computing environment 255, such as data management, synchronization, or long-duration data transfers.

Virtualized storage 260-3 includes one or more storage systems and/or one or more devices that use virtualization techniques within the storage systems or devices of computing resource 260. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 260-4 can provide hardware virtualization techniques that allow multiple operating systems (e.g., "guest operating systems") to execute concurrently on a host computer, such as computing resource 260. Hypervisor 260-4 can present a virtual operating system to the guest operating systems, and can manage the execution of the guest operating systems. Multiple instances of a variety of operating systems can share virtualized hardware resources.

Management Server 265 includes one or more devices capable of receiving, generating, storing, processing, and/or providing information associated with service area information. For example, management server 265 can include a server device (e.g., a host server, a web server, an application server, etc.), a data center device, or a similar device. In some implementations, an entity (e.g., an organization, a government entity, a business, an original equipment manufacturer (OEM), or the like) can provide (e.g., via a client device) information to management server 265 (e.g., via a management portal). For example, management server 265 can receive information associated with service area information, and provide the service area information to telemetry system 250 which can cause the service area information to be provided to telemetry devices 205.

External Server 270 includes one or more devices capable of receiving, generating, storing, processing, and/or providing information associated with service area information and/or telemetry information. For example, external server 270 can include a server device (e.g., a host server, a web server, an application server, etc.), a data center device, or a similar device. In some implementations, external server 270 can be associated with service area information, such as traffic information, weather information, route information, venue information, speed limit information, or the like.

Network 275 includes one or more wired and/or wireless networks. For example, network 275 can include a cellular network (e.g., a 5G network, an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
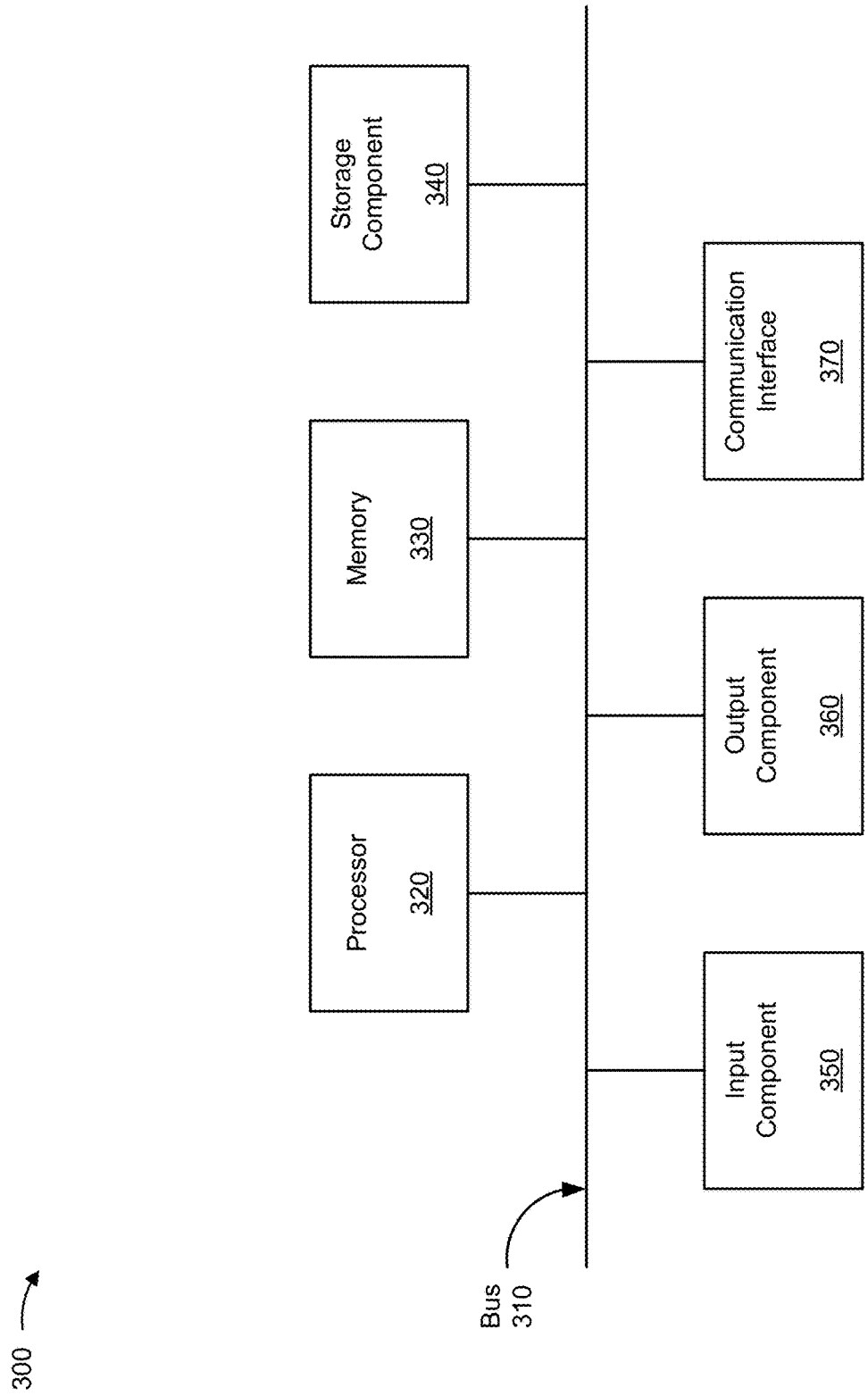
FIG. 3 is a diagram of example components of one or more devices of FIG. 2.

FIG. 3 is a diagram of example components of a device 300. Device 300 can correspond to telemetry device 205, base station 210, MME 215, SGW 220, PGW 225, MBMS-GW 230, BMSC 235, HSS 240, AAA 245, telemetry system 250, management server 265, and/or external server 270. In some implementations, telemetry device 205, base station 210, MME 215, SGW 220, PGW 225, MBMS-GW 230, BMSC 235, HSS 240, AAA 245, telemetry system 250, management server 265, and/or external server 270 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
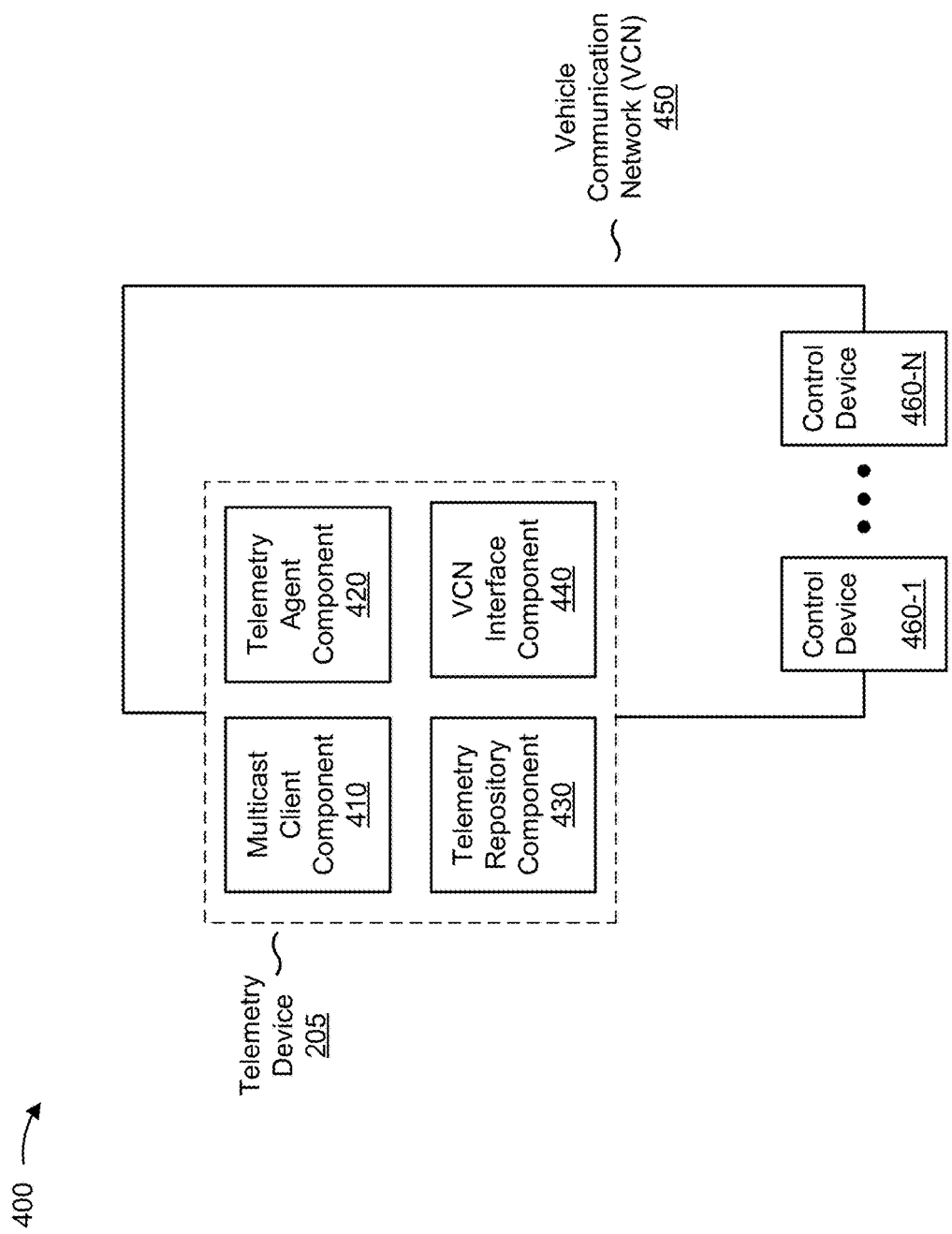
FIG. 4 is a diagram of example components of one or more devices of FIG. 2.

FIG. 4 is a diagram of example components of a device 400. Device 400 can correspond to telemetry device 205. In some implementations, telemetry device 205 can include one or more devices 400 and/or one or more components of device 400. As shown in FIG. 4, device 400 can include a multicast client component 410, a telemetry agent component 420, a telemetry repository component 430, a VCN interface component 440, a vehicle communication network (VCN) 450, and/or one or more control devices 460-1 through 460-N (N≥1) (hereinafter referred to collectively as "control devices 460," and individually as "control device 460").

Multicast client component 410 includes a component capable of receiving, generating, processing, storing, and/or providing service area information. For example, multicast client component 410 can receive, from telemetry system 250 (e.g., via base station 210), service area information and provide, to telemetry agent component 420, the service area information.

Telemetry agent component 420 includes a component capable of receiving, generating, processing, storing, and/or providing telemetry information and/or service area information. For example, telemetry agent component 420 can receive telemetry information from control devices 460, and provide the telemetry information to telemetry system 250. Additionally, or alternatively, telemetry agent component 420 can receive, from multicast client component 410, service area information, and provide the service area information to control devices 460.

Telemetry repository component 430 includes a component capable of receiving, generating, processing, storing, and/or providing service area information. For example, telemetry repository component 430 can receive, from multicast client component 410, service area information and store the service area information for use by control devices 460.

VCN interface component 440 includes a transceiver-like component, such as a transceiver and/or a separate receiver and transmitter, that permits multicast client component 410, telemetry agent component 420, and/or telemetry repository component 430 to communicate with control devices 460 via VCN(s) 450. In some implementations, multicast client component 410, telemetry agent component 420, and/or telemetry repository component 430 can communicate with control devices 460 via VCN interface component 440 using a particular communication protocol.

VCN 450 includes one or more wired and/or wireless networks. For example, VCN 450 can include a network that allows telemetry device 205 (e.g., multicast client component 410, telemetry agent component 420, telemetry repository component 430, and/or VCN interface component 440) to communicate with one or more control devices 460, and/or that allows a particular control device 460 to communicate with one or more other control devices 460. In some implementations, VCN 450 can include a vehicle bus.

In some implementations, VCN 450 can operate using a message-based protocol network, such as a Society of Automotive Engineers (SAE) J1850 pulse-width modulation (PWM) protocol network, an SAE J1850 variable pulse-width (VPW) protocol network, an International Standards Organization (ISO) 914102 protocol network, an ISO 14230 Keyword Protocol 2000 (KWP2000) network, an ISO 15765 CAN protocol network (e.g., a CAN bus network), an SAE J2411 Single-Wire CAN (SWC) protocol network, an SAE J19319 protocol network, an ISO 17458 protocol network (e.g., FlexRay), an Ethernet protocol network, or the like. In some implementations, VCN 450 can facilitate the transfer of telemetry information and/or service area information associated with one or more control devices 460.

Control device 460 includes one or more devices capable of receiving, generating, processing, storing, and/or providing telemetry information and/or service area information. For example, control device 460 can include an electronics control unit (ECU) (e.g., an engine control module (ECM), a powertrain control module (PCM), a transmission control module (TCM), a brake control module (BCM), a speed control unit (SCU), a telematics control unit (TCU), a transmission control unit (TCU), a battery management system, an electronic power steering control unit (PSCU), or another control module), a sensor (e.g., a fuel pressure sensor, an engine temperature sensor, a tire pressure sensor, or another sensor), or the like.

In some implementations, control device 460 can include an embedded device associated with controlling one or more systems or sub-systems of a vehicle, such as an engine electronics system (e.g., a fuel injection rate control system, an emission control system, a turbocharger control system, a throttle control system, or the like), a transmission electronics systems (e.g., a gear shift system, a clutch system, or the like), a chassis electronics system (e.g., an anti-lock braking system (ABS), a traction control system (TCS), an electronic brake distribution (EBD) system, an electronic stability program (ESP) system, or the like), a safety system (e.g., an airbag system, a hill descent control system, an emergency brake assist system, an emergency brake assist system, or the like), a driver assistance system (e.g., an advanced driver-assistance system (ADAS), a lane assist system, a speed assist system, a blind spot detection system, a park assist system, an adaptive cruise control system, a pre-collision assist system, or the like), an infotainment system (e.g., a navigation system, a multimedia system, an information access system, a heads up display system, or the like), an autonomous driving system (e.g., a radar system, a Lidar system, a GPS system, a computer vision system, a vehicle communication system, or the like), and/or the like.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5A:
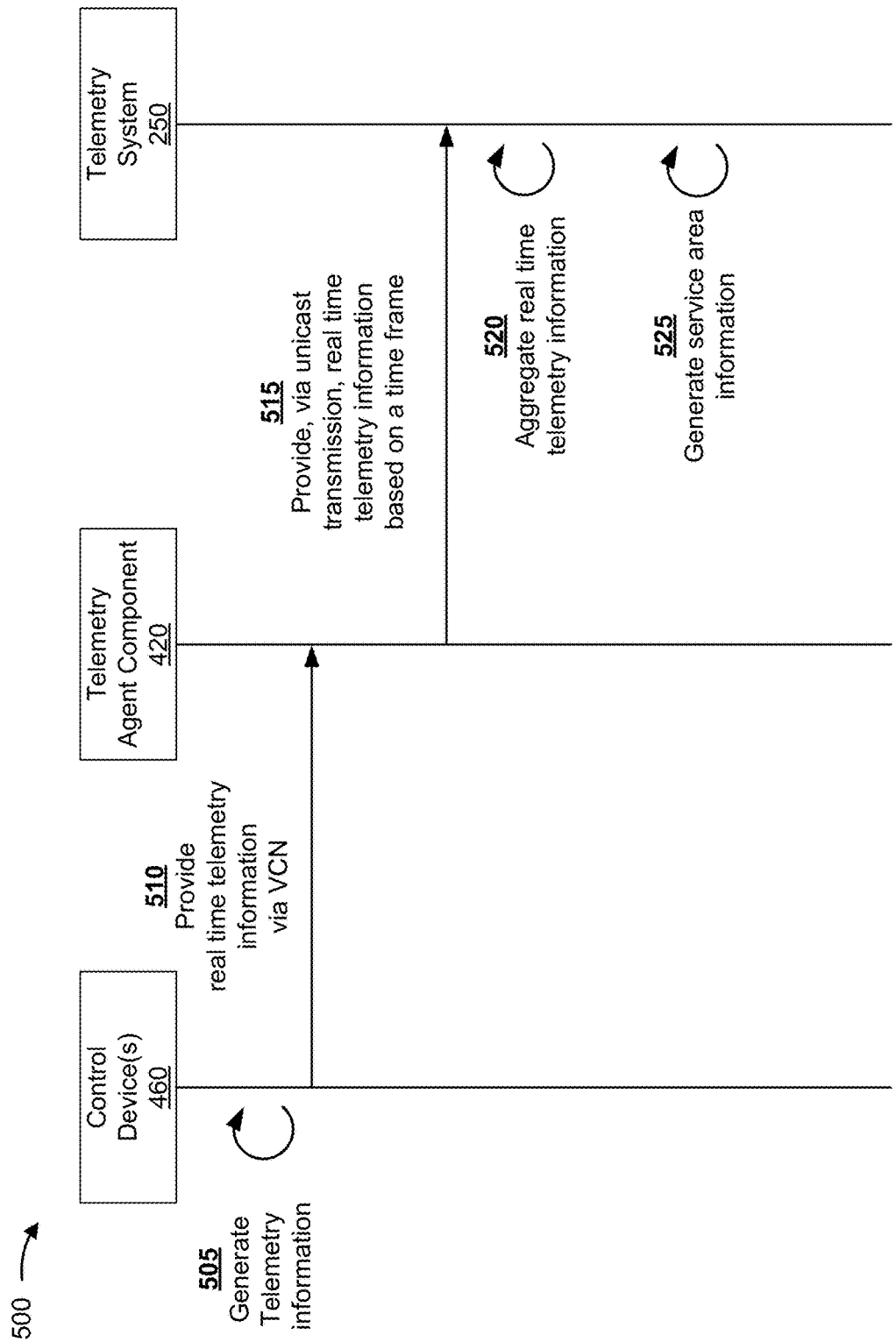
FIGS. 5A-5C are diagrams of a call flow of example operations capable of being performed by one or more devices of FIG. 2 and/or one or more components of one or more devices of FIG. 2.
Figure 5B:
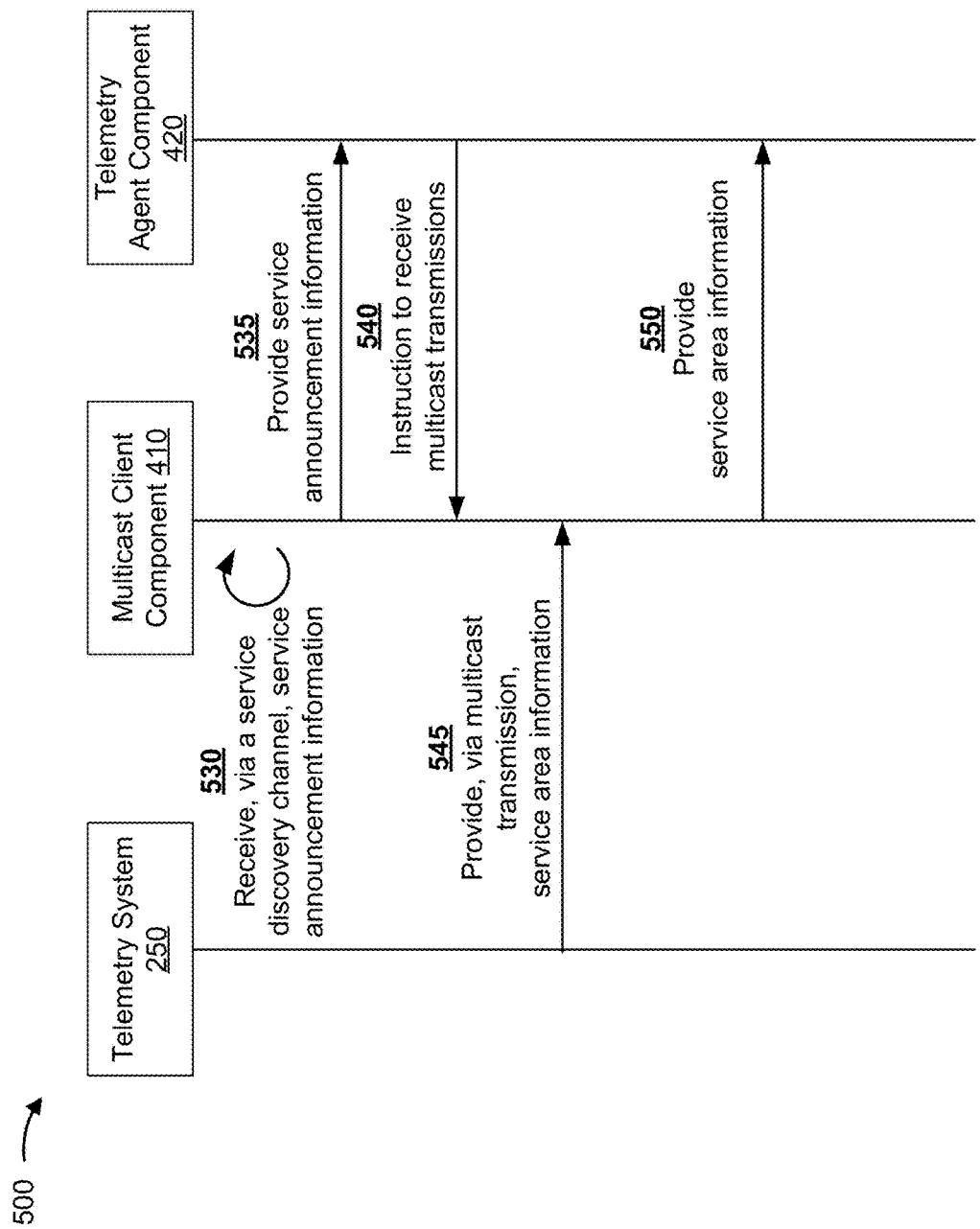
Figure 5C:
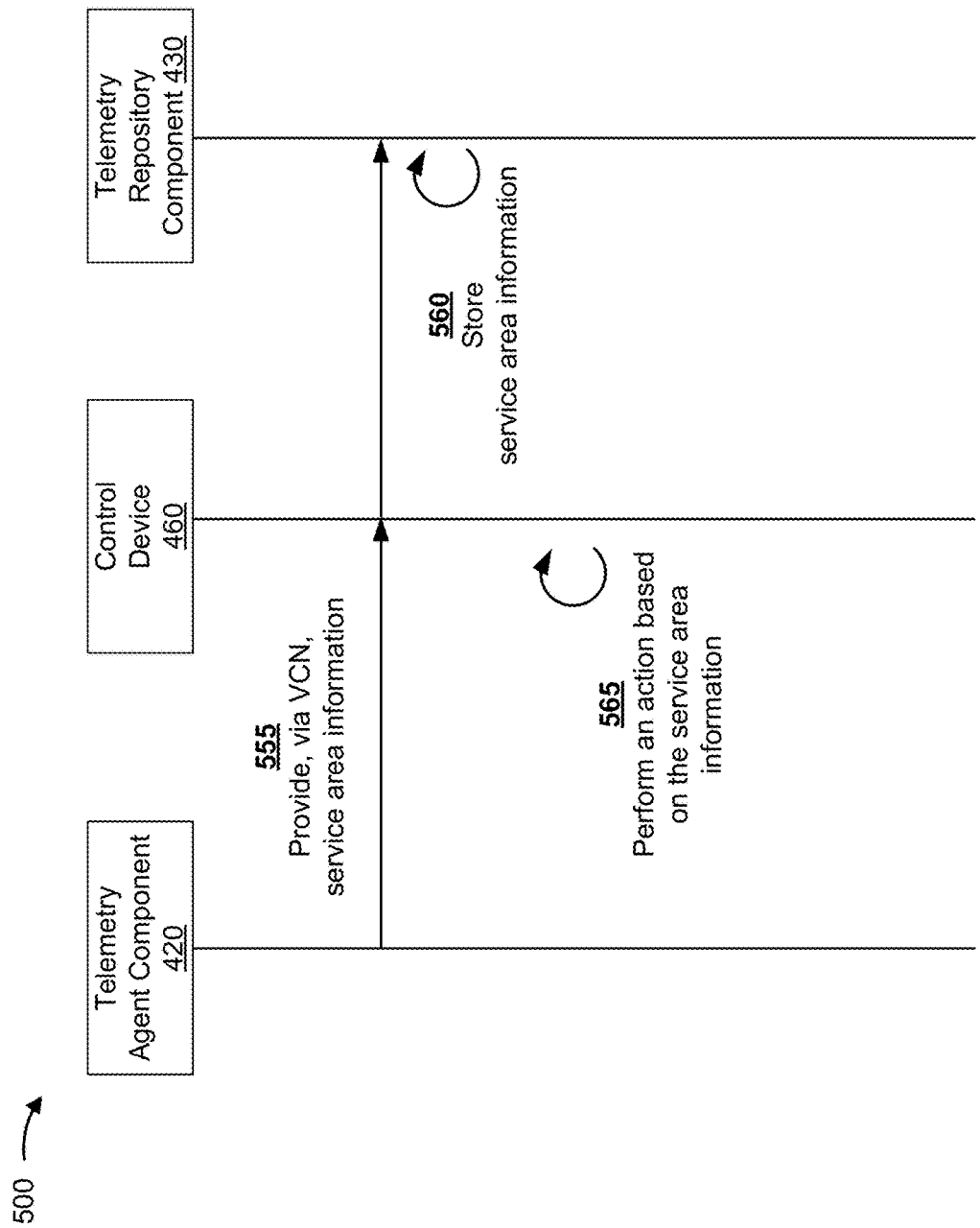

FIGS. 5A-5C are diagrams of an example call flow 500 of example operations capable of being performed by one or more devices of FIG. 2 and/or one or more components of one or more devices of FIG. 2. For example, FIGS. 5A-5C are diagrams of an example call flow 500 for providing service area information via a multicast service.

As shown in FIG. 5A, and by reference number 505, control device 460 can generate telemetry information. In some implementations, telemetry information can refer to information that is associated with one or more control devices 460. For example, a control device 460 can generate telemetry information based on operation of a vehicle that includes control device 460. In other words, a control device 460 can be associated with a parameter (or a set of parameters), and can generate, measure, sense, etc. parameter values associated with the parameter (or the set of parameters).

In some implementations, different control devices 460 can generate different types of telemetry information that correspond to different parameters. For example, a first control device 460 can determine a geolocation of a vehicle, a second control device 460 can determine a velocity of the vehicle, a third control device 460 can determine an engine speed of the vehicle, etc. In some implementations, different types of vehicles can include different types of control devices 460 that generate various types of telemetry information. As such, it should be understood that telemetry information can refer to any type of information that is associated with a vehicle.

As further shown in FIG. 5A, and by reference number 510, control device 460 can provide real time telemetry information via VCN 450. In this case, "real time" telemetry information can refer to telemetry information that is provided substantially concurrently with an underlying event associated with the generation, detection, measurement, etc. of the telemetry information. In some implementations, telemetry agent component 420 can receive, from control devices 460 via VCN 450, the real time telemetry information. While some implementations described herein refer to "real time telemetry information," it should be understood that "telemetry information" and "real-time telemetry information" can be used interchangeably.

As further shown in FIG. 5A, and by reference number 515, telemetry agent component 420 can provide, via unicast transmission, real time telemetry information based on a time frame. For example, telemetry agent component 420 can provide the real time telemetry information to telemetry system 250. In some implementations, unicast transmission can refer to a one-to-one transmission from one point in a network (e.g., network 275) to another point in the network, each identified by a network address. In some implementations, a time frame can refer to an interval, such as every millisecond, every second, every five seconds, every thirty seconds, every minute, or the like.

In some implementations, telemetry agent component 420 can provide real time telemetry information based on an event. For example, telemetry agent component 420 can provide the real time telemetry information based on a particular geolocation of telemetry device 205. Additionally, or alternatively, telemetry agent component 420 can provide the real time telemetry information based on a parameter value associated with the telemetry information (e.g., where a parameter value satisfies a threshold). Additionally, or alternatively, telemetry agent component 420 can provide the real time telemetry information based on telemetry device 205 (e.g., a vehicle associated with telemetry device 205) entering, leaving, being within, etc. a service area.

In some implementations, the real time telemetry information can include parameter values associated with control devices 460. Additionally, or alternatively, the real time telemetry information can include metadata, such as information that identifies telemetry device 205, information that identifies a type of vehicle associated with telemetry device 205 (e.g., a make, a model, a software version, or the like), information that identifies control devices 460, or the like.

In some implementations, telemetry agent component 420 can provide all of the telemetry information that is available, a subset of the telemetry information, or the like. For example, telemetry device 205 can receive configuration information that identifies particular types of telemetry information that are to be provided to telemetry system 250, and provide, based on the configuration information, the particular types of telemetry information.

In some implementations, telemetry agent component 420 can provide different types of real time telemetry information at different intervals. For example, telemetry agent component 420 can provide a first type of telemetry information that corresponds to a first control device 460 (e.g., an engine speed) at a first interval, and can provide a second type of telemetry information that corresponds to a second control device 460 (e.g., a tire pressure sensor) at a second interval that is different than the first interval.

As further shown in FIG. 5A, and by reference number 520, telemetry system 250 can aggregate real time telemetry information from a set of telemetry devices 205. In some implementations, telemetry system 250 can receive real time telemetry information from hundreds, thousands, millions, etc. of telemetry devices 205. Additionally, or alternatively, telemetry system 250 can perform one or more big data techniques to efficiently process the real time telemetry information.

In some implementations, telemetry system 250 can aggregate real time telemetry information based on a service area. In some implementations, a service area can refer to an area associated with a geofence, such as a set of geographic coordinates that define an area (e.g., a perimeter, a boundary, etc.). Additionally, or alternatively, a service area can refer to an area in which telemetry device 205 can receive multicast transmissions of service area information, as described elsewhere herein. Additionally, or alternatively, a service area can refer to a set of cells (e.g., areas covered by particular base station(s) 210). In other words, a service area can refer to a particular geolocation.

In some implementations, telemetry system 250 can identify real time telemetry information associated with a set of telemetry devices 205 that are associated with a service area. For example, telemetry system 250 can identify a service area associated with the real time telemetry information based on respective geolocations of telemetry device 205, and aggregate the real time telemetry information with the service area. As a specific example, assume that one thousand vehicles (and corresponding telemetry devices 205) include respective geolocations that are within a service area. In this case, telemetry system 250 can identify one thousand data points, corresponding to respective telemetry devices 205, associated with the service area.

As further shown in FIG. 5A, and by reference number 525, telemetry system 250 can generate service area information. In some implementations, telemetry system 250 can process the real time telemetry information to generate service area information. For example, telemetry system 250 can aggregate the respective real time telemetry information to generate service area information. In some implementations, telemetry system 250 can implement a technique to process the real time telemetry information. In some implementations, telemetry system 250 can generate service area information for thousands, millions, billions, etc. of service areas.

In some implementations, the service area information can include real time telemetry information associated with a set of telemetry devices 205. For example, the service area information can include or be based on the real time telemetry information associated with a set of telemetry devices 205 in geolocations within a service area. As a specific example, the service area information can include information associated with respective geolocations of each vehicle in a service area. In other words, telemetry information can refer to data that is associated with a particular vehicle (e.g., generated by a set of control devices 460 of the vehicle), whereas service area information can refer to data that is associated with a set of vehicles that are associated with a service area (e.g., generated by respective control devices 460 of the set of vehicles).

In some implementations, the service area information can include a set of parameters that correspond to the real time telemetry information. For example, assume that telemetry device 205 provides real time telemetry information that includes ten parameter values associated with a vehicle (e.g., a geolocation, a velocity, a status, etc.). Additionally, assume that there are ten vehicles within a service area. In this case, telemetry system 250 can receive, from respective telemetry devices 205, ten different data points that correspond to the ten respective vehicles. Additionally, in this case, telemetry system 250 can receive one hundred parameter values. In this case, and as an example, the service area information can include the one hundred parameter values (e.g., ten geolocations, ten velocities, ten statuses, etc.).

In some implementations, the service area information can include a subset of parameters associated with the real time telemetry information. For example, and continuing with the above example, the service area information can include ten parameter values (e.g., ten geolocations) instead of the one hundred parameter values. In some implementations, different telemetry devices 205, that correspond to different vehicles, can provide different types of information, different quantities of information, etc. to telemetry system 250. In this way, telemetry system 250 can provide service area information that includes a subset of the real time telemetry information, such as telemetry information that is capable of being used by all of the vehicles, a majority of the vehicles, etc.

In some implementations, the service area information can include a service area information identifier. For example, a service area information identifier can identify a particular type of service area information. In some implementations, telemetry device 205 can identify, using the service area information identifier, the particular type of service area information, and/or can identify a particular control device 460 to which to provide the service area information.

In some implementations, the service area information can include respective telemetry device 205 identifiers, vehicle identifiers, control device 460 identifiers, or the like. In this way, telemetry devices 205 can identify, using the service area information, a particular vehicle and/or telemetry device 205 to which a particular parameter value, of the service area information, corresponds. Additionally, or alternatively, telemetry device 205 can identify a particular control device 460 that is to receive the service area information. Additionally, or alternatively, telemetry device 205 can determine to discard, disregard, etc. the service area information in the event that a vehicle associated with telemetry device 205 does not include a particular control device 460 to which the service area information is applicable.

In some implementations, the service area information can include information associated with the service area. For example, the service area information can include information that identifies a condition associated with the service area. As a specific example, the service area information can include information that identifies a condition determined by telemetry system 250 based on real time telemetry information associated with a set of telemetry devices 205, such as a traffic condition, a weather condition, a hazard condition, or the like.

In some implementations, the service area information can include information that is pertinent to the service area, such as information that identifies a speed limit associated with the service area, route information associated with the service area, geolocation information associated with venues of the service area (e.g., restaurants, lodging, entertainment venues, etc.), geolocation information of user devices (e.g., mobile phones, tablet computers, etc.) associated with the service area (e.g., associated with ride sharing patrons), or the like. Additionally, or alternatively, the service area information can include information that identifies suggested parameter values of the service area, such as parameter values that control devices 460 should be generating (e.g., a vehicle speed, a trajectory, a spacing distance between vehicles, or the like).

In some implementations, telemetry system 250 can receive, from management server 265 and/or external servers 270, service area information, and provide the service area information to telemetry devices 205 via a multicast service. For example, the service area information might not be based on telemetry information in some cases. In other words, telemetry system 250 can provide service area information that is not generated based on telemetry information received from telemetry devices 205.

In some implementations, the service area information can include information that permits and/or causes a control device 460 of a vehicle to perform an action. For example, various control devices 460 of a vehicle can perform actions based on the service area information, such as by adjusting a velocity of a vehicle, adjusting a position relative to another vehicle, adjusting a route associated with the vehicle, adjusting a parameter value to more closely align with other parameter values of other vehicles of the service area, or the like.

As shown in FIG. 5B, and by reference number 530, multicast client component 410 can receive, via a service discovery channel, service announcement information. In some implementations, multicast client component 410 can monitor a service discovery channel (e.g., a multicast service discovery channel) for transmissions. In some implementations, multicast client component 410 can receive, from base station 210, service announcement information (e.g., a service announcement file) based on telemetry device 205 being associated with a service area (e.g., as a vehicle enters the service area).

As further shown in FIG. 5B, and by reference number 535, multicast client component 410 can provide service announcement information. For example, multicast client component 410 can provide, to telemetry agent component 420, the service announcement information after receiving the service announcement information.

As further shown in FIG. 5B, and by reference number 540, telemetry agent component 420 can provide an instruction to receive multicast transmissions. For example, telemetry agent component 420 can provide, to multicast client component 410 and based on the service announcement information, an instruction that causes multicast client component 410 to monitor for multicast transmissions from base station 210.

In this way, processor and/or memory resources of telemetry device 205 can be conserved by reducing an amount of time during which multicast client component 410 is monitoring for service area information. For example, multicast client component 410 can refrain from monitoring for multicast transmissions in situations where service area information is not being provided via a multicast service.

As further shown in FIG. 5B, and by reference number 545, telemetry system 250 can provide, via multicast transmission, service area information. For example, telemetry system 250 can provide, to a set of base stations 210, service area information that is to be provided to telemetry devices 205 that are located within the service area. In some implementations, telemetry system 250 can cause the set of base stations 210 to provide a multicast transmission of service area information. For example, a base station 210 can provide, via multicast transmission, service area information that is capable of being received by telemetry devices 205 that are within a service area, a particular subset of a service area, or the like.

In some implementations, telemetry system 250 can send a request, to MBMS-GW 230 and/or BMSC 235, to establish a multicast service (e.g., an eMBMS) associated with a multicast network, for providing the service area information. In this case, the multicast service can use one or more communication channels to transmit the multicast stream, which can include the service area information and control signal information. Also in this case, MBMS-GW 230 and/or BMSC 235 can establish the multicast service using base station 210 and the other(s) base station(s) 210 associated with the multicast network.

In some implementations, telemetry system 250 can provide, to telemetry devices 205, information that permits and/or causes telemetry devices 205 to receive the multicast transmissions. In this way, telemetry system 250 can provide synchronized information (i.e., each telemetry device 205 can receive the multicast transmissions simultaneously, substantially concurrently, etc.), thereby reducing a quantity of signaling, reducing a margin of data delivery error, and conserving network resources.

In this way, some implementations described herein enable synchronized delivery of service area information which can be used for latency sensitive applications such as ADAS, autonomous driving systems, etc. Additionally, in this way, some implementations described herein can improve safety, efficiency, reliability, etc. of usage of such latency sensitive applications. For example, some implementations described herein might offer improved communication exchange as compared to vehicle to vehicle communications that might require more signaling, might result in inaccurate and/or incomplete information, might be computationally expensive, etc.

As further shown in FIG. 5B, and by reference number 550, multicast client component 410 can provide the service area information. For example, multicast client component 410 can provide, to telemetry agent component 420, service area information after receiving the service area information from telemetry system 250.

As shown in FIG. 5C, and by reference number 555, telemetry agent component 420 can provide, via VCN 450, the service area information to control device(s) 460 and telemetry repository component 430. For example, control devices 460 and telemetry repository component 430 can receive the service area information from telemetry agent component 420. As further shown in FIG. 5C, and by reference number 560, telemetry repository component 430 can store the service area information. For example, telemetry repository component 430 can store the service area information, such as for additional processing, for later use by control device(s) 460, or the like.

As further shown in FIG. 5C, and by reference number 565, control device 460 can perform an action based on the service area information. In some implementations, the service area information can include information that permits and/or causes control device 460 to perform an action. In some implementations, an action can correspond to an action that is capable of being performed by control device 460 of a vehicle. For example, a control device 460 that controls an engine electronics system can adjust an engine speed of a vehicle based on the service area information, such as by increasing an engine speed in situations where other vehicles of the service area are associated with higher engine speeds as compared to the vehicle.

As another example, a control device 460 that controls a chassis electronics system can adjust a stability setting or a traction control setting based on conditions identified by the service area information, such as adjusting settings to accommodate for hazardous conditions, or the like. As yet another example, a control device 460 that controls an ADAS can utilize the service area information to identify geolocations of other vehicles of the service area, and adjust a trajectory of the vehicle based on the respective geolocations of the other vehicles (e.g., to avoid a collision, to maintain a safe spacing, to reduce congestion associated with a particular route, or the like). While particular examples are provided, it should be understood that control devices 460 can perform other actions based on other types of service area information.

As indicated above, FIGS. 5A-5C are provided merely as an example. Other examples are possible and can differ from what was described with regard to FIGS. 5A-5C.

Figure 6:
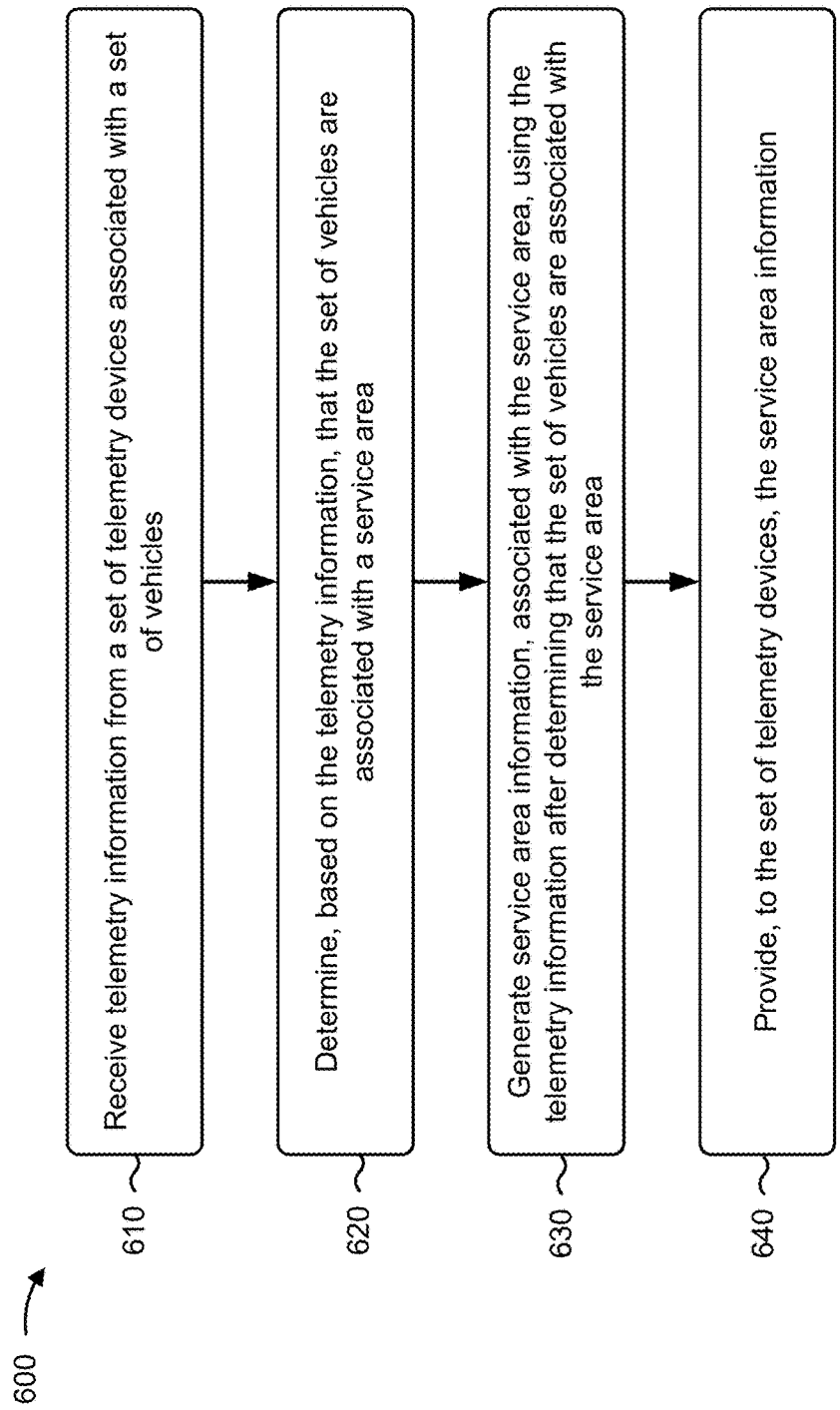
FIG. 6 is a flow chart of an example process for providing service area information via a multicast service.

FIG. 6 is a flow chart of an example process 600 for providing service area information via a multicast service. In some implementations, one or more process blocks of FIG. 6 can be performed by telemetry system 250. In some implementations, one or more process blocks of FIG. 6 can be performed by another device or a group of devices separate from or including telemetry system 250, such as telemetry device 205, base station 210, MME 215, SGW 220, PGW 225, MBMS-GW 230, BMSC 235, HSS 240, AAA 245, management server 265, and/or external server 270.

As shown in FIG. 6, process 600 can include receiving telemetry information from a set of telemetry devices associated with a set of vehicles (block 610). For example, telemetry system 250 can receive, via unicast transmissions from telemetry devices 205, telemetry information.

In some implementations, the telemetry information can be associated with a set of control devices of the set of vehicles. Additionally, or alternatively, the telemetry information can be associated with a set of vehicle communication networks. In some implementations, the telemetry information might include a velocity of a vehicle or a geolocation of a vehicle.

As further shown in FIG. 6, process 600 can include determining, based on the telemetry information, that the set of vehicles are associated with a service area (block 620). For example, telemetry system 250 can determine, based on the telemetry information, that the set of vehicles are associated with a service area.

In some implementations, telemetry system 250 can identify respective geolocations of the set of vehicles, and determine that the set of vehicles are associated with the service area based on the respective geolocations.

As further shown in FIG. 6, process 600 can include generating service area information, associated with the service area, using the telemetry information after determining that the set of vehicles are associated with the service area (block 630). For example, telemetry system 250 can generate service area information, associated with the service area, using the telemetry information after determining that the set of vehicles are associated with the service area. In some implementations, the service area information can include a speed limit associated with the service area, a traffic condition associated with the service area, route information associated with the service area, geolocation information of a set of vehicles of the service area, or the like.

In some implementations, telemetry system 250 can identify a set of parameter values associated with the telemetry information, and can generate the service area information using a subset of the set of parameter values. As an example, assume that the service area information includes ten parameter values. In this case, telemetry system 250 can generate the service area information using a subset of the ten parameter values (e.g., one parameter value, three parameter values, or the like).

As further shown in FIG. 6, process 600 can include providing, to the set of telemetry devices, the service area information (block 640). For example, telemetry system 250 can provide, to the set of telemetry devices, the service area information using a multicast service. In some implementations, telemetry system 250 can provide, to a set of base stations 210, the service area information. For example, the set of base stations 210 might be associated with the service area.

In some implementations, telemetry system 250 can receive, from management server 265 and/or external server 270, other service area information, and provide the other service area information to telemetry devices 205. In some implementations, the service area information might not be based on the telemetry information.

In some implementations, telemetry system 250 can generate an instruction based on the telemetry information, and provide, to the set of telemetry devices 205, the instruction to cause a control device, of the vehicle, to perform an action. For example, telemetry system 250 can identify a control device and generate an instruction after identifying the control device. In some implementations, a control device can be associated with a vehicle communication network. For example, a control device can be associated with an autonomous driving system, an advanced driver assistance system, or the like.

Although FIG. 6 shows example blocks of process 600, in some implementations, process 600 can include additional blocks, fewer blocks, different blocks, or differently arranged blocks than those depicted in FIG. 6. Additionally, or alternatively, two or more of the blocks of process 600 can be performed in parallel.

In this way, implementations described herein allow for synchronized information delivery (e.g., in latency sensitive applications, such as autonomous vehicle systems, ADAS, etc.), decrease margin of error in data delivery, allow for efficient network usage (e.g., reduced number of simultaneous pings) by efficient distribution and efficient use of network bandwidth, and require less communication and/or signaling relative to direct vehicle to vehicle communications.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, coupled to the one or more memories, to:
receive telemetry information from a set of telemetry devices associated with a set of vehicles,
the telemetry information being received via a set of unicast transmissions that correspond to the set of telemetry devices, and
the telemetry information being generated by a set of control devices of the set of vehicles;
determine, based on the telemetry information, that the set of vehicles are associated with a service area;
generate service area information, associated with the service area, using the telemetry information after determining that the set of vehicles are associated with the service area,
the service area information including geolocation information of the set of vehicles; and
provide, to the set of telemetry devices, the service area information to permit a control device, of the set of control devices, of a vehicle of the set of vehicles, to control an autonomous driving system of the vehicle based on the service area information,
the control device including an electronic power steering control unit to adjust steering of the vehicle based on the service area information to one or more of:
avoid collision with another vehicle of the set of vehicles, or
maintain a particular spacing between the vehicle and another vehicle of the set of vehicles, the service area information being provided via a multicast transmission to the set of telemetry devices associated with the set of vehicles, and
the service area information being provided synchronously via the multicast transmission for latency sensitive systems including the autonomous driving system.

2. The device of claim 1, where the one or more processors are further to:
receive information that identifies respective geolocations of the set of vehicles; and
where the one or more processors, when determining that the set of vehicles are associated with the service area, are to:
determine that the set of vehicles are associated with the service area based on the information that identifies respective geolocations of the set of vehicles.

3. The device of claim 1, where the one or more processors are further to:
identify a set of parameter values associated with the telemetry information; and
where the one or more processors, when generating the service area information, are to:
generate the service area information using a subset of the set of parameter values.

4. The device of claim 1, where the one or more processors are further to:
receive, from another device, other service area information that is associated with the service area,
the other service area information not being associated with the set of telemetry devices; and
provide, to the set of telemetry devices, the other service area information.

5. The device of claim 1, where the one or more processors are further to:
generate an instruction based on the telemetry information; and
provide, to the set of telemetry devices, the instruction to cause the control device, of the vehicle, to control the autonomous driving system.

6. The device of claim 1, where the control device is associated with a vehicle communication network.

7. The device of claim 1, where the one or more processors are further to:
adjust, based on the service area information, a stability setting or a traction control setting of the vehicle.

8. A non-transitory computer-readable medium storing instructions, the instructions comprising:
one or more instructions that, when executed by one or more processors, cause the one or more processors to:
receive telemetry information from a set of telemetry devices associated with a set of vehicles,
the set of telemetry devices to provide, via respective unicast transmissions, the telemetry information,
the telemetry information being generated by a set of control devices of the set of vehicles;
determine, based on the telemetry information, that the set of vehicles are associated with a service area;
generate service area information, associated with the service area, using the telemetry information after determining that the set of vehicles are associated with the service area,
the service area information including geolocation information of the set of vehicles; and
provide, to the set of telemetry devices, the service area information to permit a control device, of the set of control devices, of a vehicle of the set of vehicles, to control an autonomous driving system of the vehicle based on the service area information, the control device including an electronic power steering control unit to adjust steering of the vehicle based on the service area information to one or more of:
avoid collision with another vehicle of the set of vehicles, or
maintain a particular spacing between the vehicle and another vehicle of the set of vehicles,
the service area information being provided via a multicast transmission to the set of telemetry devices associated with the set of vehicles, and
the service area information being provided synchronously via the multicast transmission for latency sensitive systems including the autonomous driving system.

9. The non-transitory computer-readable medium of claim 8, where the one or more instructions, when executed by the one or more processors, further cause the one or more processors to:
identify, using the telemetry information, respective geolocations of the set of telemetry devices; and
where the one or more instructions, that cause the one or more processors to determine that the set of vehicles are associated with the service area, are to:
determine that the set of vehicles are associated with the service area after identifying the respective geolocations of the set of telemetry devices.

10. The non-transitory computer-readable medium of claim 8, where the one or more instructions, when executed by the one or more processors, further cause the one or more processors to:
identify a set of parameter values, associated with the telemetry information, after receiving the telemetry information; and
where the one or more instructions, that cause the one or more processors to generate the service area information, cause the one or more processors to:
generate the service area information using a subset of the set of parameter values.

11. The non-transitory computer-readable medium of claim 8, where the service area information includes other information associated with the service area that is not based on the telemetry information.

12. The non-transitory computer-readable medium of claim 8, where the telemetry information includes a velocity of the vehicle of the set of vehicles.

13. The non-transitory computer-readable medium of claim 8, where the set of telemetry devices are associated with a set of vehicle communication networks.

14. The non-transitory computer-readable medium of claim 8, where the one or more instructions, when executed by the one or more processors, further cause the one or more processors to:
receive, from another device, other service area information that is associated with the service area,
the other service area information not being associated with the set of telemetry devices; and
provide, to the set of telemetry devices, the other service area information.

15. A method, comprising:
receiving, by a device and via a set of unicast transmissions, telemetry information from a set of telemetry devices associated with a set of vehicles,
the telemetry information being generated by a set of control devices of the set of vehicles;

determining, by the device and based on the telemetry information, that the set of vehicles are associated with a service area;

generating, by the device, service area information, associated with the service area, using the telemetry information after determining that the set of vehicles are associated with the service area, the service area information including geolocation information of the set of vehicles; and providing, by the device and to the set of telemetry devices via a multicast transmission, the service area information to permit a control device, of the set of control devices, of a vehicle of the set of vehicles, to control an autonomous driving system of the vehicle based on the service area information, the control device including an electronic power steering control unit to adjust steering of the vehicle based the service area information to one or more of:
avoid collision with another vehicle of the set of vehicles, or
maintain a particular spacing between the vehicle and another vehicle of the set of vehicles, and the service area information being provided synchronously via the multicast transmission for latency sensitive systems including the autonomous driving system.

16. The method of claim 15, further comprising:
providing, to a set of base stations, the service area information,
the set of base stations being associated with the service area; and
where providing the service area information comprises:
providing the service area information based on providing the service area information to the set of base stations.

17. The method of claim 15, further comprising:
receiving, from another device, other service area information that is not based on telemetry information; and
providing, to the set of telemetry devices, the other service area information.

18. The method of claim 15, further comprising:
identifying the control device;
generating, after identifying the control device, an instruction that is capable of causing the control device to control the autonomous driving system; and
providing, to the control device, the instruction to cause the control device to control the autonomous driving system.

19. The method of claim 15, where the service area information includes at least one of:
a speed limit associated with the service area,
a traffic condition associated with the service area, or
route information associated with the service area.

20. The method of claim 15, further comprising:
adjusting, based on the service area information, a stability setting or a traction control setting of the vehicle.

* * * * *